United States Patent Office 3,105,012
Patented Sept. 24, 1963

3,105,012
ANTIGEN PRODUCTS AND MEANS FOR
PRODUCING THE SAME
Frank B. Brandon, Grosse Pointe Woods, and Alton R. Taylor, Grosse Pointe Park, Mich., assignors to Parke, Davis & Company, Detroit, Mich., a corporation of Michigan
No Drawing. Filed Oct. 19, 1961, Ser. No. 146,355
11 Claims. (Cl. 167—78)

This invention relates to purified virus antigens, to products containing antigens, and to means for obtaining the same.

Available methods for the production of virus antigens involve isolation of the virus from natural sources or propagation of the virus in a suitable growth medium such as fowl embryo, cell tissue culture and the like. Because of the highly proteinaceous character of the media, the resulting virus fluids even when partially purified as by bacterial filtration, undesirably contain large amounts of nonviral protein, nonviral protein fragments, water-soluble inorganic salts and other contaminants which for diagnostic or immunogenic purposes may cause a specific antibody reaction or other complicating reaction. Hence, these nonviral contaminants limit the usefulness of the antigen product.

It is therefore an object of the present invention to provide highly purified virus antigens and means for producing the same.

It is also an object to provide virus antigens which are free of nonviral protein and other nonviral contaminants and yet which possess a high degree of antigen potency.

It is a further object to provide antigen products suitable for diagnostic and immunogenic purposes.

Other objects and advantages will appear from the description which follows.

In accordance with the invention, these and other objects are achieved by subjecting an aqueous solution containing unpurified or partially purified virus antigen to filtration with a hydrophilic water-insoluble dextran polymer gel comprising a three dimensional macroscopic network of cross-linked dextran substances, under conditions such that the nonviral protein and other contaminants are retained in the gel material and the virus antigen passes through the filter. The resulting filtered product is unique in that it possesses virtually undiminished antigenic potency as demonstrated by titration or other means and yet is essentially free of nonviral protein and other nonviral contaminants. Filtration is conveniently accomplished by preparing a chromatograph-type column containing as a filter bed hydrophilic water-insoluble dextran polymer gel grains, each grain comprising a three dimensional macroscopic network of cross-linked dextran substances, equilibrating the column with an aqueous medium such as dilute saline, passing the aqueous solution containing the virus antigen into the column in contact with the filter bed and recovering the virus antigen from the column by eluting or washing with a suitable aqueous eluant. In order to avoid introduction of contaminating impurities, filtration is preferably accomplished under sterile conditions. In contrast to conventional filtration methods wherein the solid phase is retained while the liquid phase passes through into the filtrate, the instant method achieves separation by retention or entrapment of the low molecular weight solutes or impurities in the filter bed and by transmission of the relatively large molecules in the eluate. The instant method of filtration is further distinguished from conventional methods of separation such as dialysis and the like. One of the unexpected features of the invention is that an extremely selective separation can readily be made of virus antigens from the impurities which normally accompany such antigens, by means of gel filtration.

The invention is applicable broadly to viruses of the antigenic type which are capable of causing infectious diseases in man and animals; cf. Rhodes et al., Textbook of Virology, Williams & Wilkins Co., Baltimore, third edition (1958). Some of the many viruses of this type which can be subjected to the present process are the rabies, infectious hepatitis, mumps, influenza, parainfluenza, vaccinia, equine encephalomyelitis, canine distemper, poliomyelitis, encephalomyocarditis, hog cholera, St. Louis encephalitis, yellow fever, adenovirus, measles, Coxsackie, ECHO, and common cold viruses. The nature of the aqueous solution containing the virus used as the starting material of the process is not critical. The solution should, of course, be free of apparent solids. For this purpose, the crude virus solution can be clarified by conventional methods such as decantation, filtration and centrifugation. The solution may be derived from any aqueous medium containing virus. For example, it may be derived from a tissue culture fluid, an aqueous extract or suspension of central nervous system tissue, blood cell eluate, an aqueous extract or suspension of fowl embryo, or a fowl-egg extra-embryonic fluid (i.e., allantoic or amniotic fluid) containing the virus. The preferred source of the virus will depend on individual circumstances and will vary from virus to virus. For example, in the case of the MM strain of murine encephalomyocarditis virus the preferred source is an extract or suspension of minced central nervous tissue infected with the virus; and in the case of rabies virus, an extract or suspension of brain tissue or fowl embryo infected with the virus. For eastern equine encephalomyelitis virus the preferred source is the chorioallantoic fluid of embryonated fowl eggs infected with the virus, and for poliomyelitis virus, a tissue culture fluid containing the virus. For influenza virus a convenient source is chick embryo allantoic fluid containing the virus. For adenovirus, measles, Coxsackie, ECHO, and common cold viruses a convenient starting material is a filtrate from a monkey kidney tissue culture fluid containing the virus. The virus may also be present in the form of a vaccine in which the virus is attenuated by means of serial passage in tissue culture or in which the virus is antigenic but killed by inactivation with an inactivating agent such as heat, ultraviolet or other high energy radiation, ultrasonic vibration, formaldehyde, beta-propiolactone, chlorine, phenol or the like or with a combination of any two or more such agents. The antigenic potency of the virus solutions used as a starting material is not critical and can be varied as desired.

As indicated, the gel filter material used in accordance with the invention is a hydrophilic water-insoluble cross-linked dextran polymer gel. This material and the method of its manufacture are described in British Patent No. 854,715. The gel material, which is commercially available from AB Pharmacia, Uppsala, Sweden, under the trade name "Sephadex," comprises a three dimensional macroscopic network of dextran substances bonded or cross-linked together, being capable of absorbing water with swelling. The ability of the gel material to take up water is inversely proportional to the degree of cross-linkage of dextran substances in the gel material. In other words, the greater the degree of cross-linkage, the smaller is the porosity and the water regain of the material. For filtration purposes, when the gel material in granular form having a selected porosity is contacted with a tissue culture filtrate or other aqueous medium containing the virus as well as associated protein debris and other impurities, the impurities can diffuse into the gel material whereas the virus molecules, being larger, are restricted from entering the gel grains and are caused to pass among the grains, thereby achieving a separation of the virus from the other solutes in the solution. The gel material is available in a variety of grades differing with respect to degree of porosity, e.g., up to 8 g./g. water regain and higher. Thus, through the use of gel material having a porosity which is penetrable by relatively low molecular weight solutes but impervious to diffusion by the selected virus molecule, one can achieve purification of aqueous solutions containing the virus.

In another preferred embodiment of the invention the virus solution prior to gel filtration is subjected to extraction with a water-immiscible fluorocarbon solvent. This embodiment of the invention is applicable to the purification of viruses of the type which are inert to fluorocarbon solvents in terms of their retention of antigenic potency. Extraction is conveniently accomplished by mixing the aqueous solution containing the virus, such as infectious hepatitis virus, with the fluorocarbon solvent, preferably in equal volume, causing the mixture to separate into two phases, replacing the fluorocarbon phase with fresh fluorocarbon and repeating successively the extraction of the aqueous phase for a sufficient number of times to remove substantially all nonviral fluorocarbon solubles from the aqueous phase. Ordinarily from three to eight such extractions are sufficient for this purpose. For best results about five or six extractions are employed. Although the number of extractions employed is not critical, it is desirable in the interest of maintaining the integrity of the specific antigen protein to avoid unduly long exposure to the extracting solvent or an unduly large number of extractions. The proportion of fluorocarbon solvent to the aqueous solution containing the virus may be varied depending upon conditions. For instance, with solutions of abnormally high protein content it is preferred to use a higher proportion of fluorocarbon solvent, e.g., about two volumes to one of the aqueous solution. Mixing is conveniently accomplished by means of a conventional high speed mechanical homogenizer. Extraction of the aqueous virus solution can also be carried out by first centrifuging the same and then mixing the resulting centrifuged pellet in a single step in an aqueous medium with the fluorocarbon solvent and recovering the aqueous phase which separates. This procedure is advantageous in that it not only requires less time, but also provides for concentration of the aqueous phase containing the virus antigen. The choice of fluorocarbon solvents is not critical, and any of various inert liquid fluorocarbons may be used which are immiscible with water and separate on standing in the presence of water into a discrete single phase. Among the various fluorocarbons which are suitable may be mentioned ethylidene fluoride, 1,1,1-difluorochloroethane, 1,1,2,2-tetrachloro-1,2-difluoroethane, 1,2,2-trichloro-1,1,2-trifluoroethane and similar fluorocarbon solvents. Where it is desired to employ an extracting phase having reduced density, the fluorocarbon may be used in admixture with an inert hydrophilic liquid hydrocarbon solvent having relatively low density, such as n-heptane. For the purpose of the invention the term "fluorocarbon solvent" is used herein to describe not only fluorocarbon solvents of the type mentioned, but also mixtures of the same with other water-immiscible liquid solvents such as liquid hydrocarbons.

According to another embodiment of the invention which is applicable to virus solutions generally but for purposes of illustration is described hereinafter with particular reference to solutions containing influenza virus, further purification can be achieved by subjecting the gel-filtered virus solution to ether extraction. In this procedure the virus solution is mixed with ether, preferably in approximately equal volume, and for best results in the cold, for a sufficient time to allow for substantially complete breakdown of the virus particles and extraction therefrom of ether-solubles. Ether extraction serves to disintegrate the characteristic influenza virus particle by dissolving the lipid which acts as a glue for the virus particle holding the virus components together. The preferred mixing time is about five hours for influenza virus. Following the mixing step the aqueous and ether phases are allowed to separate out, preferably in the cold, and the aqueous phase containing the desired purified virus antigen is recovered; if significant amounts of interphase materials are present, the interphase should be collected separately from the aqueous phase and re-extracted with water and ether. The aqueous extract, if desired together with any aqueous interphase extract which may be required, is then freed of any traces of dissolved ether, e.g., by bubbling in inert gas such as nitrogen through the aqueous phase and/or by holding the aqueous phase under vacuum for a period of about one hour at room temperature. Extraction of the aqueous phase with ether is facilitated by incorporating a wetting agent in the aqueous phase. Nonionic wetting agents are particularly suitable for this purpose. Preferred wetting agents are the polyoxyethylene sorbitan higher fatty acid partial esters such as polyoxyethylene sorbitan monolaurate and monooleate (known under the trade names "Tween 20" and "Tween 80," respectively). The resulting extracts, which are non-infectious and freed of non-antigenic virus factors such as lipids, can be used for the preparation of vaccines or diagnostic agents or can be used to inject animals for the preparation of specific antisera and the like. In the case of vaccine preparation, for example, a suitable influenza virus vaccine is obtained by adding a preservative such as thimerosal (1:10,000) and a stabilizer such as formalin. The optimum formalin concentration for stabilization is about 0.1%. It has been found that the ensuing interaction of formalin and the ether-extracted antigen renders the antigen, on storage, more stable to heat than the intact virus particle.

An optional feature of the invention, which can be advantageously carried out with the aqueous solutions obtained from either the gel filtration or ether extraction steps, particularly where the products have become undesirably dilute in process, provides for removal of water from solutions containing the virus antigen. Removal of water can be complete or partial, as desired. This is accomplished by dialysis of the aqueous product against a hygroscopic material separated by a water-permeable dialysis membrane. Significantly, the removal of water in this manner takes place without appreciable loss or impairment of the virus antigen. According to a preferred procedure, the aqueous solution containing the virus antigen is placed in a dialysis envelope or membrane which in turn is suspended in a suitable hygroscopic material to permit water to diffuse from the solution through the membrane into the hygroscopic material. Dialysis is allowed to continue until the desired concentration of the aqueous solution is attained. The choice of dialysis membranes is not critical since any of a variety of water-permeable membranes can be satisfactorily used. A preferred membrane is regenerated cellulose tubing, commercially available from the Visking Company, Chicago, Illinois, under the trade name "Visking." Likewise, any of a variety of inert hygroscopic materials can be used for dialysis, among which may be mentioned solid polyethylene glycols of the general formula $$HOCH_2(CH_2OCH_2)xCH_2OH$$

(commercially available in a graded series and known under the trademark "Carbowax"), polyvinyl pyrrolidone, concentrated gelatin, synthetic polysaccharide polymers such as dextran, dextran derivatives such as the material known under the trademark "Ficoll" available from AB Pharmacia, Uppsala, Sweden, and similar materials. The hygroscopic material can be used in dry form or as an aqueous concentrate. The antigen products concentrated by the mentioned dialysis procedure, either in dry or aqueous form, are highly antigenic and are particularly well suited for diagnostic purposes.

The invention is illustrated by the following examples.

EXAMPLE 1

(a) Ten milliliters of a tissue culture filtrate containing live attenuated infectious hepatitis virus (infectivity titer $10^{-7.5}$) is mixed with 10 ml. of 1,2,2-trichloro-1,1,2-trifluoroethane (available from the Allied Chemical & Dye Corporation under the registered trademark "Genetron 226") in a blending machine ("Omnimix"; 15–16 thousand r.p.m.) for a period of 30 seconds following which mixing is discontinued for one minute and then repeated for 30 seconds. The resulting mixture is separated into layers by low speed centrifugation (2500 r.p.m., International Refrigerated #1 or 2), the organic layer is discarded and the aqueous phase containing the virus is taken up by means of a pipette and mixed with an equal volume of fresh fluorocarbon for one minute in two successive periods of 30 seconds each by the procedure just described. The resulting mixture is separated into layers centrifugation, the organic layer is discarded and the aqueous phase containing the virus is recovered. The aqueous phase is further extracted four times with fresh fluorocarbon by this same extraction procedure for a total of six extractions. The resulting aqueous phase obtained as a layer which separates, containing purified infectious hepatitis virus substantially free of nonviral protein, is purified further by the procedure described below under (1c).

The tissue culture filtrate used in the foregoing procedure is obtained by growing the live virus using as an inoculum the serum of a patient suffering from infectious hepatitis, in tissue culture cells of the Detroit-6 strain of epithelial cells in a series of cultures to obtain attenuation of the virus, by the following detailed procedure: Cultures of Detroit-6 cells (Berman et al., Blood, volume 10, pages 896–911, 1955), are cultivated in stationary tubes using as a growth medium for each tube 2 ml. of a mixture of 60% Hanks' solution and 40% human serum. The cultures, when two or three days old, are washed three times with a mixture of 60% Hanks' solution and 40% serum. Each of the cultures is then seeded with 0.5 ml. of a 1:5 dilution of infectious serum [infectivity titer $(TOID_{50})$, $10^{-6.5}$] of a patient (IHAR–17) suffering from infectious hepatitis, and 1.5 ml. of maintenance medium (90% mixture No. 199 and 10% horse serum) is added to each culture. The virus is incubated at 37.5° C. with rotation for one or more days (at which time cytopathogenic degeneration occurs), while maintaining the culture on the alkaline side (pH 7.2–7.6) by periodic adjustment. The fluid containing the live virus is harvested free of cells and a 0.5-ml. aliquot is seeded into a fresh series of stationary culture tubes of Detroit-6 cells for further cultivation of the virus using the same volume per tube of maintenance medium and the same conditions of cultivation as used in the original cultures. Cultivation is continued until maximal propagation of fresh virus as evidenced by cytopathogenic degeneration of the cells. The virus fluid is then harvested and the process is repeated serially from one set of culture tubes to another using diluted or undiluted harvest fluid through a total of 11 passages. The resulting tissue culture fluid is subjected to bacterial filtration. The details of passage including the specific media used for growth and maintenance of cells, the inoculum used, the period of incubation, the volume harvested, the harvest designation and the infectivity titer at harvest are given in the following table:

*Table*

| Reference No. | Growth medium | Maintenance medium | Inoculum used (0.5 ml.) | Period of incubation (days) | Volume (ml.) of fluid harvested | Harvest designation | Infectivity titer at harvest |
|---|---|---|---|---|---|---|---|
| 0 | 60% Hanks',[1] 40% Hu. S.[3] | 90% 199,[2] 10% Ho. S.[4] | Original serum | 1 | 38 | TC$_1$ | >$10^{-2}$ |
| 1 | do | do | TC$_1$ | 4 | 8 | TC$_2$ | >$10^{-1}$ |
| 2 | do | do | TC$_2$ diluted 10:1 | 10 | 16 | TC$_3$ | $10^{-1.33}$ |
| 3 | do | do | TC$_3$ diluted 10:1 | 9 | 32 | TC$_4$ | >$10^{-3}$ |
| 4 | do | do | TC$_4$ | 10 | 40 | TC$_5$ | >$10^{-6}$ |
| 5 | 85% Eagle's,[5] 15% F.C.S.[6] | 90% 199, 10% F.C.S. | TC$_5$ diluted 10:1 | 5 | 40 | TC$_6$ | >$10^{-1}$ |
| 6 | do | do | TC$_6$ | 7 | 50 | TC$_7$ | $10^{-6.5}$ |
| 7 | do | do | TC$_7$ | 9 | 24 | TC$_8$ | |
| 8 | do | do | TC$_8$ | 14 | 26 | TC$_9$A | $10^{-6.5}$ |
| 9 | do | do | TC$_8$ diluted | 13 | 60 | TC$_9$B | |
| 10 | do | do | TC$_9$B | 8 | 72 | TC$_{10}$ | |
| 11 | do | do | TC$_{10}$ | 9 | [7] 120 | TC$_{11}$ | $10^{-7.5}$ |

[1] Hanks' = Hanks' balanced salt solution.
[2] 199 = Synthetic mixture No. 199.
[3] Hu. S. = Human serum.
[4] Ho. S. = Horse serum.
[5] Eagle's = Eagle's basal medium.
[6] F.C.S. = Fetal calf serum.
[7] Two 28-oz. bottles used instead of tubes (maintenance medium, 50 ml.; seed, 10 ml.; per bottle).

(b) An alternative procedure for fluorocarbon extraction is the following: 150 ml. of a tissue culture filtrate containing live attenuated infectious hepatitis virus (infectivity titer, $10^{-7.5}$) is placed in an ultracentrifuge (12.5 ml. in each of 12 centrifuge cups; Spinco No. 40 rotor) and centrifuged at 40,000 r.p.m. for three hours. The liquid is then decanted from each of the centrifuge cups and the remaining solid pellet in each cup is taken up by introducing 10 ml. of sterile buffered isotonic saline into one cup and serially transferring the resulting mixture through all the remaining cups. The cups are washed by introducing 5 ml. of fresh saline solution into one cup and transferring it successively through the remaining cups. The resulting solution is combined with the wash solution (total volume 15 ml.) and mixed with an equal volume of 1,2,2-trichloro-1,1,2-trifluoroethane in a blending machine (15,000–16,000 r.p.m.) for a period of 30 seconds. The mixture is then separated into layers by means of centrifugation and the resulting aqueous phase containing purified infectious hepatitis virus is recovered and processed by the procedure described in (1c) below.

(c) Sterile, water-insoluble cross-linked dextran polymer gel grains (100 g.; mesh distribution: 0.2% by weight on No. 50 U.S. screen, 4.9% through No. 270; water regain about 2–3 g./g.; available from AB Pharmacia, Uppsala, Sweden, under the trade name "Sephadex G-25") are wetted with water and the wet slurry washed three times with successive 1-liter volumes of sterile 0.05 M saline. The washed dextran is introduced as a slurry in 0.05 M saline into a vertical cylindrical glass chromatograph column (standing height, 76 cm.; inside diameter, 4 cm.) fitted at the lower end with a supporting coarse glass filter and stopcock. The gel is allowed to settle out, the column is filled with saline and shaken to free the gel of air bubbles. The column is then equilibrated with sterile buffered isotonic saline. 100 ml. of an extracted aqueous solution containing infectious hepatitis virus [produced by the procedure of (1a) or (1b)] is then added to the column at a flow rate of about 1 ml.

per minute while maintaining a fluid head of about 2 cm. Following introduction of the virus solution, 250 ml. of sterile buffered isotonic saline is added to the column at the same flow rate and at the same fluid head. The first 100 ml. of the effluent from the column is discarded; the following 150-ml. fraction which contains purified infectious hepatitis virus is collected under sterile conditions.

If desired, the column can be regenerated by washing with sterile saline solution, and further amounts of unfiltered virus solution can then be processed through the column.

The sterile effluent containing the purified virus can be used for the preparation of vaccines or immune sera. Where the virus starting material employed is either killed or sufficiently attenuated, the resulting effluent can be used directly as a vaccine for administration by conventional means. The effluent can also be used as a diagnostic agent. If desired, the effluent can be concentrated by dialysis to a small volume by the following procedure: a 50-ml. aliquot of the effluent is placed in a sealed regenerated cellulose (Visking) envelope, and the envelope is suspended in 100 g. of dry, solid polyethylene glycol flakes (Carbowax 20M) contained in a beaker. The envelope is maintained in this position and dialysis is allowed to continue for several hours until the desired amount of water is removed, whereupon the envelope is removed and the aqueous concentrate recovered. To facilitate dialysis, fresh amounts of polyethylene glycol flakes can be added from time to time. Complete removal of water from an aqueous solution having a volume of 50 ml. requires about 10–12 hours.

The foregoing procedures of Examples 1*a*, *b*, and *c* can be used for the preparation of other antigenic materials derived from different virus starting materials. For example, in place of a tissue culture filtrate containing live attenuated infectious hepatitis virus, one can use an aqueous medium in equal volume containing vaccinia, poliomyelitis, adeno or Coxsackie virus antigen, particularly, for purposes of illustration, one of the following starting materials:

Centrifugate of chorio-allantoic fluid obtained from embryonated chicken eggs infected wtih vaccinia virus, infectivity titer $10^{-6}$;

Monkey kidney tissue culture filtrate containing one of types 1, 2 or 3 of poliomyelitis virus which has been killed partly by treatment with formaldehyde and partly by exposure to ultraviolet light (cf. British Patent No. 802,048);

Monkey kidney tissue culture filtrate (03 Selas filter) containing adenovirus (type 3, 4 or 7) having an infectivity titer of $10^{-3}$;

Fluid obtained by filtering a monkey kidney tissue culture (successively through coarse, medium, fine and ultrafine sintered glass filters) of Coxsackie (type A or B) virus, infectivity titer $10^{-5}$.

EXAMPLE 2

(*a*) To a saline-equilibrated Sephadex G–25 column prepared as described in Example 1*c* is added about 100 ml. of an aqueous centrifugate containing influenza virus (hemagglutination titer, $4\times10^4$ HA units per ml.), addition being accomplished at a flow rate of about one and one-half ml. per minute while maintaining a fluid head of 2 cm. Sterile buffered isotonic saline (250 ml.) is then added to the column using the same flow rate and fluid head. The 100-ml. effluent fraction which follows the first 100 ml. of effluent and which contains the influenza virus in purified form is collected under sterile conditions. The procedure achieves 10-fold or higher purification; the virus content and antigenicity of the concentrate so obtained are substantially the same as that of the centrifugate starting material.

The centrifugate starting material is prepared as follows: 11-day old embryonated chick eggs are inoculated with influenza virus (either of type A, A–1, A–2 or B; for example, the PR–8, Ann Arbor, Asian or Great Lakes strain, respectively) and incubated for 48 hours at about 35° C. Following incubation, the allantoic fluid is collected, centrifuged and the resulting sediment is resuspended in saline and ball-milled for 12 to 15 hours. The resulting aqueous virus suspension is then cleared in a low speed centrifuge.

(*b*) Polyoxyethylene sorbitan monooleate (Tween 80) is added to the virus concentrate obtained in Example 2*a*, in a concentration of one mg./ml. The resulting mixture is combined with an equal volume of ether and the resulting aqueous ether mixture is stirred in the cold (0–10° C.) for about five hours at a rate such that no foaming occurs and yet no separation of the two phases takes place. The aqueous and ether phases are then allowed to separate in the cold, the ether layer is removed and the aqueous phase is collected together with any interphase material. Traces of ether remaining in the aqueous phase are removed first by bubbling nitrogen through the aqueous phase and then by holding the aqueous phase under vacuum at room temperature for about one hour. The resulting aqueous antigen product is non-infectious and can be used for immunogenic, propylactic or diagnostic purposes. For example, a vaccine having superior storage properties can be prepared from the aqeuous product by mixing the same with a preservative such as thimerosal (to an ultimate concentration of 1:10,000 parts by volume) and with formaldehyde (about 1:1000 parts by volume).

The foregoing procedures of Examples 2*a* and *b* and the concentration procedure of Example 1*c* can be used for the preparation of other antigenic materials derived from different virus starting materials. For example, in place of a centrifugate containing influenza virus one can use an aqueous medium in equal volume containing parainfluenza virus or mumps virus: in the case of para-influenza virus one can use a centrifugate of chick embryo allantoic culture fluid containing para-influenza virus (type 1, Sendai), $5\times10^4$ HA units; in the case of mumps virus one can use a centrifugate of chick embryo amniotic culture fluid containing mumps virus, infectivity (hemagglutination) titer $10^{-4}$.

While in the foregoing description we have set forth in detail certain embodiments of the present invention, it will be understood by those skilled in the art that considerable variation may be made in such detail without departing from the spirit of our invention.

We claim:

1. Process for the preparation of antigen products which comprises:
   placing an aqueous solution containing virus antigen in contact with wetted hydrophilic water-insoluble cross-linked dextran polymer gel capable of absorbing water with swelling and having a porosity smaller than the molecular size of said virus antigen;
   washing said gel with an aqueous eluant; and
   recovering from said gel an aqueous eluate containing virus antigen.

2. Process according to claim 1 wherein said antigen is infectious hepatitis virus antigen.

3. Process according to claim 1 wherein said antigen is influenza virus antigen.

4. Process for the preparation of antigen products which comprises the steps of:
   mixing an aqueous solution containing virus antigen and nonviral contaminants with fluorocarbon solvent for a time sufficient to allow for dissolution of fluorocarbon-solubles;
   causing the mixture to separate into an aqueous phase and a fluorocarbon phase;
   removing and placing the aqueous phase in contact with wetted hydrophilic water-insoluble cross-linked dextran polymer gel capable of absorbing water with swelling and having a porosity smaller than the molecular size of said virus antigen;

washing said gel with an aqueous eluant; and recovering from said gel an aqueous eluate containing virus antigen.

5. Process according to claim 4 wherein said antigen is infectious hepatitis virus antigen.

6. Process according to claim 4 which includes subjecting the aqueous eluate to dialysis whereby water is removed from said eluate.

7. Process for the purification of virus antigen which comprises the steps of:

introducing an aqueous solution containing virus antigen and nonviral contaminants into a zone containing wetted hydrophilic water-insoluble cross-linked polymer gel capable of absorbing water and having a porosity permeable by said nonviral contaminants but impermeable by said virus antigen;

washing said gel with aqueous eluant; and recovering from said zone an aqueous eluate containing virus antigen.

8. Process according to claim 7 which includes the additional steps of:

mixing the aqueous eluate with ether for a time sufficient to allow for dissolution of ether-solubles;

causing the mixture to separate into an aqueous phase and an ether phase; and recovering the aqueous phase.

9. Process according to claim 8 wherein the eluate contains influenza virus antigen.

10. Process according to claim 8 wherein the mixing step is carried out in the cold employing approximately equal volumes of the aqueous eluate and ether.

11. Process according to claim 10 which includes incorporating the aqueous phase with formaldehyde in a concentration of about 0.1% by volume.

References Cited in the file of this patent

UNITED STATES PATENTS 3,042,667   Flodin et al. _____ July 3, 1962

OTHER REFERENCES

Gessler et al.: (I) "A New and Rapid Method for Isolating Viruses by Selective Fluorocarbon Deproteinization," Trans. N.Y. Acad. Sci., vol. 18, pp. 701–703 (1956).

Gessler et al.: (III) "Animal Viruses Isolated by Fluorocarbon Emulsification," Trans. N.Y. Acad. Sci., vol. 18, pp. 707–717 (1956).

Prudhomme: "L'Ultra-filtration fractionnée," Chimie Analytique, vol. 39, pp. 133–141 (1957).

Hummeler et al.: (I) "Removal of Anticomplementary Activity and Host Antigens from Viral Preparations by Fluorocarbon," Science, vol. 125, No. 3247, pp. 547–548, Mar. 22, 1957.

Manson et al.: "Purification of Poliovirus With Fluorocarbon," Science, vol. 125, No. 3247, pp. 546–547, Mar. 22, 1957.

Drug Trade News (vol. 32, No. 17), "Describe Use of Fluorocarbon in Virus Purification," page 40, Aug. 26, 1957.

Hummeler et al.: (II) "Dissociation of Poliomyelitis Virus From Neutralizing Antibody," Virology, vol. 6, No. 1, pp. 297–299 (1958).

Epstein: "An Investigation Into the Purifying Effect of a Fluorocarbon on Vaccinia Virus," Brit. J. of Exp. Pathology, vol. 39, pp. 436–446 (1958).

Hamparian et al.: "Elimination of Non-Specific Components From Viral Antigens by Fluorocarbon," J. Immunology, vol. 80, pp. 468–475 (1958).

Halonen et al.: "Preparation of ECHO Complement-Fixing Antigens in Monkey Kidney Tissue Culture and Their Purification by Fluorocarbon," Proc. Soc. Exp. Biol. and Med., vol. 97, No. 3, pp. 530–536, March 1958.

Stone et al.: "Purification of the Mouse Mammary Carcinoma Agent by Means of a Fluorocarbon," Nature, vol. 183, No. 4670, pp. 1275–1276, May 2, 1959.

Porath, J.: (I) "Gel Filtration: A Method for Desalting and Group Separation," Nature 183, pp. 1657–1659, June 13, 1959.

Porath, J.: (II) "Fractionation of Polypeptides and Proteins on Dextran Gels," Clin. Chim. Acta, 4, pp. 776–778, November 1959.

Stansly et al.: "Some Properties of Fluorocarbon—Treated Animal Tissue," Proc. Soc. Exp. Biol. and Med., vol. 103, No. 1 (No. 25398), pp. 20–22, January 1960.

Porath, J.: (III) "Gel Filtration of Proteins, Peptides, and Amino Acids," Biochim. Biophys. Acta, 39, pp. 193–207, April 8, 1960.

Flodin, P., et al.: "A Method for Concentration Solutes of High Molecular Weight," Nature 188, pp. 493–4, Nov. 5, 1960.

Kabat et al.: "Experimental Immunochemistry," 2nd edition, "Preparation With Ether . . . ," page 201; "Diffusion—Diffusion Coefficients From Antigen Antibody Interaction in Gels," pp. 675–686, published (May 1961), Chas. C. Thomas, Springfield, Ill.

Porath J., et al.: (IV) "Separation Methods Based on Molecular Sieving and Ion Exclusion," Nature 191, pp. 69–70, July 1, 1961.

UNITED STATES PATENT OFFICE
CERTIFICATE OF CORRECTION

Patent No. 3,105,012                     September 24, 1963

Frank B. Brandon et al.

It is hereby certified that error appears in the above numbered patent requiring correction and that the said Letters Patent should read as corrected below.

Column 1, line 24, for "a specific" read -- aspecific --; column 2, line 55, before "its" insert -- of --; column 4, line 47, for "apperciable" read -- appreciable --; column 5, line 42, after "layers" insert -- by --; line 66, for "$TOID_{50}$" read -- $TCID_{50}$ --.

Signed and sealed this 15th day of September 1964.

(SEAL)
Attest:

ERNEST W. SWIDER
Attesting Officer

EDWARD J. BRENNER
Commissioner of Patents